United States Patent Office 2,853,521
Patented Sept. 23, 1958

2,853,521

HYDROXYLATED BENZOPHENONE ETHERS

William B. Hardy, Bound Brook, Warren S. Forster, Basking Ridge, and Ralph A. Coleman, Middlesex, N. J., assignors to American Cyanamid Company, New York, N. Y., a corporation of Maine No Drawing. Application June 20, 1956
Serial No. 592,509

5 Claims. (Cl. 260—591)

This invention relates to benzophenones; and more particularly, to hydroxylated benzophenone ethers represented by the formula

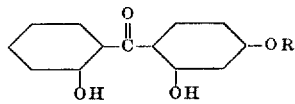

where R is alkyl.

Various benzophenones have been used as ultraviolet light absorbing materials. However, many of these are not satisfactory. A good ultraviolet absorber for use in plastics should absorb the ultraviolet in sunlight and at the same time be a colorless material by visual observation. The compound should impart no color to the plastic composition, should be sufficiently stable to undergo the conditions of curing of the plastic, and should absorb ultraviolet light sufficiently to protect the composition against yellowing and decomposition on exposure to ultraviolet light. Furthermore, the compound must have sufficient solubility in various types of materials so that it may be easily incorporated into various plastic formulations. This latter property is especially important, since an incompletely dispersed product would give poor protection.

Generally, an effective ultraviolet absorber should have its peak absorption above a wave length of 320 millimicrons. The absorption peak may be at a higher wave length, as long as absorption drops off sufficiently as it approaches the visual range so that no visible color is shown by the compound. In addition, to be effective, it should show a high degree of absorbency in the desired wave length range. As a measure of the degree of absorbency, an absorption index may be used. This is a relation expressed as a figure to show an index of the degree of absorption per amount of material at a particular wave length (defined below). A high absorbency index indicates greater absorption. However, for the most desirable ultraviolet protection, the high absorbency index should be at those wave lengths sufficiently below the visual range so that the compound has no yellow color visually.

Of the compounds used as ultraviolet absorbers, many have the disadvantages of showing various degrees of yellow color and poor solubility. If the compound has a yellow color, it also imparts a yellow color to the plastic composition, which is undesirable since one of the purposes of the absorber is to prevent yellowing by the action of U. V. light. As a measure of the visible yellow color of the compound, the absorption in the blue region of the visible range may be measured. This is conveniently done by determining the absorption index at a wave length in the visual range. The absorption index at a wave length of 420 millimicrons, for example, measures the degree of yellow color possessed by the compound.

We have found that benzophenones of the structure:

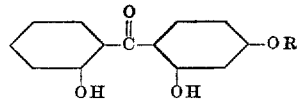

in which R is defined as above, form a class of ultraviolet absorbers of unusual and very advantageous properties.

The compounds of this invention have especially desirable properties as ultraviolet absorbers. As shown by the absorbency index at 420 millimicrons, they are superior to commercial products in reference to yellow color. They show high absorption in the desirable ranges and at the same time show low absorption in the visual ranges. They, furthermore, show superior solubility in various organic solvents and plasticizers, and the like, and have more desirable properties than many of the ultraviolet absorbing compounds in commercial use.

The compounds of this invention have especially de-unexpected effect which greatly adds to their utility. They have the unusual property of possessing widely different wave lengths of maximum absorption, depending on the solvent or resin in which they are dissolved or dispersed. In hydrocarbon type solvents, such as aromatic hydrocarbons (xylene, toluene, etc.), aliphatic hydrocarbons (hexane), or hydrocarbon polymers (polyethylene, polypropylene, and the like), the wave length of maximum absorption is in the vicinity of 350 millimicrons. This gives a maximum of protection to polyethylene and similar type plastics where the natural opaqueness of the resin conceals the very slight yellow color which accompanies a high wave length of maximum absorption. The color is slight—much less than would be expected with such a high wave length of absorption, but even such a slight color would be undesirable in an ultraviolet absorber to be used in a clear plastic such as a polyacrylate or a modified alkyd. It is desirable for a U. V. absorber to have a wave length of maximum absorption as high as is possible without developing visible color. It is therefore most unexpected and greatly advantageous that the compounds of our invention possess the unique property of having a wave length of maximum absorption in the vicinity of 330 millimicrons when dissolved or dispersed in oxygenated solvents or resins. This difference is enough that the absorption in the visible is virtually eliminated and no visible color is observed. Such solvents and resins include solvents such as alcohols, esters and ketones and resins such as the polyacrylates, alkyds, and the like. This shift in wave length of maximum absorption thus permits the utilization of the compounds of our invention in a wide variety of resins, to give maximum protection without discoloring clear, transparent resins. This effect is especially true of 2,2'-dihydroxy-4-methoxy benzophenone.

The compounds of this invention are prepared in several ways. One is the usual Friedel-Crafts type of reaction in which an appropriately substituted benzoyl chloride is reacted with the appropriate alkoxy benzene in the presence of a catalyst. Where hydroxyl groups are ortho to the carbonyl in either end of the benzophenone, they are usually alkylated in the starting material, and dealkylation occurs during the reaction.

This method is usable only when the ortho hydroxyls are substituted with lower alkyls such as methyl or ethyl. Higher alkoxy groups are not as readily dealkylated.

An alternative and far more flexible method is based on the selective reactivity of the para hydroxyl group in polyhydroxybenzophenones. As starting materials one uses, 2,2',4-trihydroxybenzophenone. The para hydroxyl may be selectively etherified. The etherifying reagents may be dialkyl sulfate such as diethyl or dimethyl sulfate. They may be alkyl halides such as methyl, ethyl, propyl, isoamyl, hexyl, heptyl, lauryl, or octadecyl chlorides, bromides or iodides. They may be aralkyl halides such as benzyl chloride, bromide, or iodide. They may be substituted alkyl halides such as ethylene chlorhydrin, propylene chlorhydrin, the corresponding bromohydrins, chloracetic acid, bromoacetic acid, α-chloropropionic acid, α-bromobutyric acid, and the like, chloracetonitrile, bromoacetonitrile, α-bromopropionitrile, and the like, chloracetaldehyde, chloracetone, chloracetophenone, and similar compounds. In each case the corresponding substituent becomes the group R in the general formula:

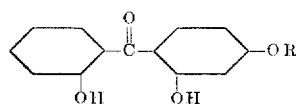

The resinous compositions containing the U. V. absorbers of this invention form another aspect of the invention, which is claimed in Serial No. 607,986, filed September 5, 1956, a continuation-in-part of our copending application Serial No. 522,832, filed July 18, 1955, now abandoned, of which this application is also a continuation-in-part. These U. V. absorbers are especially useful in protecting polymerized unsaturated compounds as well as modified unsaturated polyester resins from deterioration by the action of ultraviolet light. Among the resins which may be so protected are polyolefines such as polyethylene, polypropylene polyvinylchloride, polyacrylate derivatives such as polymethylmethacrylate, and condensation products of polyhydric alcohols such as glycol, glycerine, and the like with α,β-unsaturated polybasic acids such as maleic or fumaric acids, or itaconic acid, modified with a vinyl compound such as styrene. The absorbers are incorporated into the compositions before molding. Generally, from 0.001 to 5% by weight is used. The compositions which are preferred are those with the modified polyester resins and those with polyethylene.

In the preparation of the unsaturated polyester resins used in the present invention, one should make use of the alpha, beta unsaturated polycarboxylic acids such as maleic, fumaric, aconitic, itaconic, monochloro maleic anhydride and the like. These unsaturated acids should be present in an amount approximating at least 20% by weight of the total weight of the polycarboxylic acids used and preferably in amounts varying between about 25% and 65% by weight based on the total weight of polycarboxylic acid present. If it is desired to make use of saturated polycarboxylic acids, that is, those which are free of non-benzenoid unsaturation, one could use such acids as phthalic, malonic, succinic, glutaric, sebacic and chlorinated polycarboxylic acids such as tetrachlorophthalic anhydride, hexachloroendo-methylene tetrahydrophthalic acid and the like but in amounts less than a larger proportion of the total amount of polycarboxylic acid present.

Whenever available the anhydrides of these acids may be used or mixtures of the acids or mixtures of the anhydrides thereof.

As polyhydric alcohols which may be used to prepare the unsaturated polyesters of the present invention, it is preferred to make use of those alcohols having only two hydroxy groups although minor amounts of alcohols having three hydroxy groups, four hydroxy groups or more hydroxy groups may be used in minor amounts. As dihydroxy alcohols, one could use ethylene glycol, diethylene glycol, propylene glycol, dipropylene glycol, butanediol 1-4, butanediol 1-3, butanediol 1-2, pentanediol 1-2, pentanediol 1-3, pentanediol 1-4, pentanediol 1-5, hexanediol 1-6 and the like. Additionally, one could use glycerol, pentaerythritol, dipentaerythritol and the like.

The modifier for the polyester resin is a polymerizable material having a CH$_2$=C< group. Amongst these polymerizable compounds are styrene, side chain substituted styrenes such as the alpha methylstyrene, alpha ethylstyrene and the like or ring substituted styrene such as ortho, meta and para-alkyl styrenes such as o-methylstyrene, p-ethylstyrene, meta-propylstyrene, 2,4-dimethylstyrene, 2,5-diethylstyrene, and the like. Still further, one can make use of the allyl compounds such as diallyl phthalate, allyl alcohol, methallyl alcohol, allyl acetate, allyl methacrylate, diallyl carbonate, allyl lactate, allyl alpha-hydroxyisobutyrate, allyl trichlorosiane, allyl acrylate, diallyl malonate, diallyl oxalate, diallyl gluconate, diallyl methylgluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane and the like.

Another preferred use of the new compounds of our invention is in polyolefines, such as polyethylene and polypropylene. Unlike the commercially available U. V. absorbers, some of which are chemically related, the compounds of our invention show a remarkably good solubility in polyolefines. This is an important advantage, since it permits the protection of this important class of resins against decoloration by light. The wide use today of polyethylene "squeeze" bottles for cosmetics, drugs and other materials emphasizes the importance of such protection.

Our invention can be further illustrated by the following examples, in which parts are by weight unless otherwise specified:

EXAMPLE 1

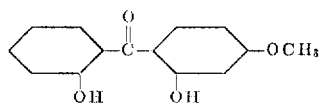

A mixture of 88 parts of 1,3-dimethoxybenzene, 550 parts of chlorobenzene, and 162 parts of aluminum chloride is prepared. To this mixture is added gradually with cooling 102.4 parts of orthomethoxybenzoyl chloride. The mixture is then gradually heated, with stirring, to a temperature of 88° C. After stirring at that temperature a short time, the mass can no longer be stirred and it is removed from the flask and decomposed in 2000 parts of ice and 140 parts of concentrated hydrochloric acid. Steam is used to clean out the flask. The heated mixture is filtered through glass wool and the chlorobenzene layer is separated and steamed free of chlorobenzene. The residue is heated with 315 parts of 95% alcohol and a white insoluble by-product which forms is removed by filtration. The alcohol solution is diluted with water and the oil layer which forms is taken up in 158 parts of alcohol. This solution is then distilled under reduced pressure (about 1 mm.). The product is cut into the following fractions:

(1) 6.5 g. distilling at 164–185°C.
(2) 30.6 g. distilling at 170–175° C. heated temperature through an 8″ helix packed column.

This second fraction, in the form of a thick yellow oil, solidifies after standing several days to a waxy solid.

EXAMPLE 2

*Solubilities in various solvents*

[g./100 g. solutions at 25° C.]

| Solvent | 2-hydroxy-4,4'-dimethoxy benzophenone | 2,2'-dihydroxy-4,4'-dimethoxy benzophenone | 2-hydroxy-4'-methoxy benzophenone | 2,2'-dihydroxy 4-methoxy benzophenone |
|---|---|---|---|---|
| 95% ethanol | 0.7 | 0.5 | 10.8 | 21.4 |
| n/hexane | 0.3 | 0.1 | 6.0 | 2.3 |
| benzene | 12.2 | 5.2 | 73.8 | 46.6 |
| xylene | 5.7 | 2.9 | 62.2 | 30.6 |
| di-2-ethylhexyl-phthalate | 2.7 | 1.3 | 27.3 | 14.8 |
| tricresyl phosphate | 4.0 | 1.0 | 24.0 | 20.7 |
| tri-2-ethylhexyl phosphate | 2.4 | 2.8 | 26.7 | 31.1 |
| di-2-ethylhexyl sebacate | 1.7 | 1.1 | 27.3 | 14.8 |

EXAMPLE 3

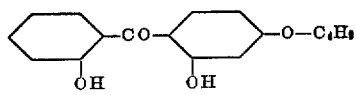

A mixture of 23 parts of 2,2',4'-trihydroxybenzophenone, 15 parts of butyl bromide, 200 parts of alcohol, and 6.0 parts of soda ash is heated at reflux until the reaction is substantially complete. The crude 2,2'-dihydroxy-4-butoxybenzophenone is isolated by drowning in water and filtering. It is purified by recrystallization from organic solvents such as alcohol or toluene. By using equivalent quantities of lauryl bromide or octadecyl bromide the corresponding higher alkoxy compounds are similarly prepared.

EXAMPLE 4

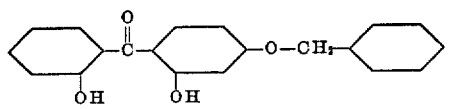

The procedure of Example 3 is followed using an equivalent amount of benzyl chloride in place of the butyl bromide to give 2,2'-dihydroxy-4-benzyloxybenzophenone.

EXAMPLE 5

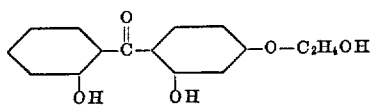

The procedure of Example 3 is followed, using an equivalent amount of ethylene chlorohydrin in place of the butyl bromide, to give 2,2'-dihydroxy-4-hydroxyethoxybenzophenone.

EXAMPLE 6

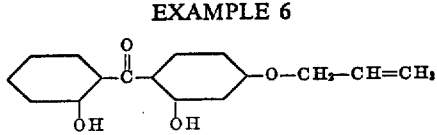

The procedure of Example 3 is followed, using an equivalent amount of allyl bromide in place of the butyl bromide, to give 2,2'-dihydroxy-4-allyloxybenzophenone.

EXAMPLE 7

One part of the compound of Example 1 is dissolved in 1000 parts by volume of methanol. Five ml. of this solution is added to 100 parts of polymethylmethacrylate powder and mixed therein. The alcohol is evaporated and the residual material is molded at 325° F. The resulting product shows improved resistance to U. V. light.

EXAMPLE 8

A mixture of 100 parts of polyvinylchloride, 50 parts of dioctyl phthalate, 2.0 parts of barium cadmium laurate, 1.0 part of a triarylphosphite, and 0.2 part of the product of Example 1 is milled and then molded at 325° F. The resultant composition shows improved resistance to U. V. light.

EXAMPLE 9

A polyester resin is prepared by coreacting 3 mols of phthalic anhydride, 3 mols of fumaric acid and 6.6 mols of propylene glycol. When esterification is substantially complete, as indicated by an acid number of about 30–40, there is added styrene in a sufficient amount to equal ½ of the polyester resin present and 0.02% by weight of ditertiarybutylhydroquinone based on the total weight of the unsaturated polyester and styrene, so that the ultimate composition contains 2 parts by weight of polyester resin per part by weight of monomeric styrene.

EXAMPLE 10

To 200 parts of the product of Example 9 is added 2 parts of lauryl mercaptan as a 10% solution in styrene, 2 parts of methyl ethyl ketone peroxide catalyst and 0.25% by weight of the product of Example 1. The mixture is cured 18 hours at 125–250° F. Panels of this casting are subjected to ultraviolet light. They show little discoloration after many hours of exposure, whereas, if a similar composition, but without the product of Example 1, is thus tested, it develops a marked yellow appearance.

EXAMPLE 11

U. V. absorbers, as indicated in the table below, are milled into polyethylene in proportions of 0.05 to 0.2% at 325° F. and the mixture is pressed into sheets 0.010 to 0.020 inch thick. The sheets are then exposed in fadeometer to U. V. light. The oxidation of the polymer is followed by the increase in the intensity of the carbonyl infrared band. The table below gives the relative amounts of observed oxidation, taking unprotected, pure polyethylene as the standard of 100%.

|  |  | 200 hours |
|---|---|---|
| 0.05% | 2-hydroxy-4-methoxy 4'-tertiary butyl benzophenone | 72 |
| 0.10% | 2-hydroxy-4-methoxy 4'-tertiary butyl benzophenone | 76 |
| 0.1% | 2,2'-dihydroxy-4-methoxybenzophenone | 24 |
| 0.2% | 2,2'-dihydroxy-4-methoxybenzophenone | 20 |

We claim:
1. Compounds of the formula:

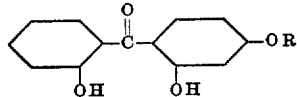

2. The compound of claim 1 in which R is methyl.
3. The compound of claim 1 in which R is butyl.
4. The compound of claim 1 in which R is dodecyl.
5. The compound of claim 1 in which R is octadecyl.

References Cited in the file of this patent

UNITED STATES PATENTS 2,682,559     Stanley et al.            June 29, 1954

OTHER REFERENCES

Auwers et al.: Ber. Deut. Chem., vol. 40, pp. 3515, 3517, 3518 (1907).
Tasaki: Chemisches Zentralblatt, 1925, pp. 1354–1356.
Lothrop: J. Am. Chem. Soc. vol. 61, p. 2118 (1939).

UNITED STATES PATENT OFFICE
CERTIFICATE OF CORRECTION

Patent No. 2,853,521 September 23, 1958

William B. Hardy et al.

It is hereby certified that error appears in the printed specification of the above numbered patent requiring correction and that the said Letters Patent should read as corrected below.

Column 6, line 55, claim 1, following the formula, insert

-- in which R is alkyl.--.

Signed and sealed this 30th day of December 1958.

(SEAL)
Attest:

KARL H. AXLINE
Attesting Officer

ROBERT C. WATSON
Commissioner of Patents